United States Patent
Moyer et al.

(10) Patent No.: US 8,438,547 B2
(45) Date of Patent: May 7, 2013

(54) ADDRESS TRANSLATION TRACE MESSAGE GENERATION FOR DEBUG

(75) Inventors: William C. Moyer, Dripping Springs, TX (US); Richard G. Collins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1012 days.

(21) Appl. No.: 12/435,723

(22) Filed: May 5, 2009

(65) Prior Publication Data

US 2010/0287417 A1    Nov. 11, 2010

(51) Int. Cl.
G06F 9/44    (2006.01)
G06F 9/45    (2006.01)

(52) U.S. Cl.
USPC ............................ 717/128; 717/124; 717/127

(58) Field of Classification Search ........... 717/124–132
See application file for complete search history.

(56) References Cited

U.S. PATENT DOCUMENTS

| | | | |
|---|---|---|---|
| 5,630,049 A | | 5/1997 | Cardoza et al. |
| 5,822,588 A * | | 10/1998 | Sterling et al. ............... 717/131 |
| 5,842,225 A | | 11/1998 | Kohn |
| 5,913,923 A | | 6/1999 | Dunlap et al. |
| 6,009,270 A * | | 12/1999 | Mann ........................... 717/128 |
| 6,101,524 A * | | 8/2000 | Choi et al. .................... 718/102 |
| 6,145,100 A * | | 11/2000 | Madduri ........................ 714/45 |
| 6,167,536 A * | | 12/2000 | Mann ............................ 714/45 |
| 6,189,140 B1 * | | 2/2001 | Madduri ...................... 717/128 |
| 6,282,701 B1 * | | 8/2001 | Wygodny et al. ............ 717/125 |
| 6,662,359 B1 * | | 12/2003 | Berry et al. .................. 717/130 |
| 6,769,076 B1 | | 7/2004 | Moyer et al. |
| 6,779,145 B1 | | 8/2004 | Edwards et al. |
| 6,826,747 B1 * | | 11/2004 | Augsburg et al. ............. 717/128 |
| 6,859,891 B2 | | 2/2005 | Edwards et al. |
| 6,918,065 B1 | | 7/2005 | Edwards et al. |
| 6,941,545 B1 * | | 9/2005 | Reese et al. ................... 717/130 |
| 7,051,237 B2 | | 5/2006 | Mayer |
| 7,093,236 B2 * | | 8/2006 | Swaine et al. ................ 717/128 |
| 7,134,116 B1 | | 11/2006 | Thekkath et al. |
| 7,137,110 B1 * | | 11/2006 | Reese et al. ................... 717/158 |

(Continued)

FOREIGN PATENT DOCUMENTS

EP    1091298 B1    7/2008

OTHER PUBLICATIONS

Milenkovic et al, "Algorithms and hardware structures for unobtrusive real time compression of instruction and data address traces" IEEE DCC, pp. 1-10, 2007.*

(Continued)

*Primary Examiner* — Anil Khatri (57) ABSTRACT

A data processing system and method generates debug messages by permitting an external debug tool to have real-time trace functionality. A data processor executes a plurality of data processing instructions and uses a memory for information storage. Debug module generates debug messages including address translation trace messages. A memory management unit has address translation logic for implementing address translation to translate addresses between virtual and physical forms. The debug module includes message generation module that is coupled to the memory management unit for receiving notice when one or more address translation mappings are modified. The message generation module generates an address translation trace message in response to a detection of a modification of an address translation mapping occurs and provides the address translation trace message external to the debug module.

19 Claims, 6 Drawing Sheets

U.S. PATENT DOCUMENTS

| | | | |
|---|---|---|---|
| 7,203,926 B2 * | 4/2007 | Bogle et al. | 717/124 |
| 7,210,072 B2 * | 4/2007 | Swoboda et al. | 714/45 |
| 7,219,333 B2 * | 5/2007 | Agarwala et al. | 717/128 |
| 7,281,237 B2 * | 10/2007 | de Jong | 717/126 |
| 7,346,476 B2 | 3/2008 | Levine et al. | |
| 7,434,108 B2 | 10/2008 | Moyer et al. | |
| 7,506,318 B1 * | 3/2009 | Lindo et al. | 717/130 |
| 7,533,302 B2 | 5/2009 | Wu | |
| 7,739,667 B2 * | 6/2010 | Callahan et al. | 717/128 |
| 7,770,156 B2 * | 8/2010 | Thekkath | 717/128 |
| 7,797,686 B2 * | 9/2010 | Agarwala et al. | 717/128 |
| 7,823,135 B2 * | 10/2010 | Horning et al. | 717/127 |
| 8,024,708 B2 * | 9/2011 | Demetriou et al. | 717/124 |
| 8,079,019 B2 * | 12/2011 | Lindo et al. | 717/129 |
| 8,166,462 B2 * | 4/2012 | Kosche et al. | 717/130 |
| 8,176,472 B2 * | 5/2012 | Kim | 717/113 |
| 2006/0036830 A1 | 2/2006 | De Dinechin et al. | |
| 2006/0117224 A1 | 6/2006 | Wu | |
| 2006/0156099 A1 | 7/2006 | Sweet et al. | |
| 2006/0227224 A1 | 10/2006 | Kawata et al. | |
| 2010/0023735 A1 | 1/2010 | Moyer | |
| 2010/0023811 A1 | 1/2010 | Moyer | |
| 2010/0023812 A1 | 1/2010 | Moyer | |
| 2010/0211827 A1 | 8/2010 | Moyer et al. | |
| 2010/0211828 A1 | 8/2010 | Moyer et al. | |

OTHER PUBLICATIONS

Tikir et al, "Recompilation for debugging support in a JIT compiler", ACM PASTE, pp. 10-17, 2002.*

Allen et al, "Serialization sets: A dynamic dependence based parallel execution model", ACM PPoPP, pp. 85-95, 2009.*

Sheng et al, "RACEZ: A lightweight and non invasive race detection tool for production applications", ACM ICE, pp. 401-410, 2011.*

PCT Application No. PCT/US2010/031251; Search Report and Written Opinion dated Oct. 28, 2010.

Mayer, A. et al., "Multi-Core Debug Solution IP: SoC Software debugging and Performance Optimization," IPextreme, May 2007; printed from <<http://www.maojet.com.tw/files/PDF/IP/IPextreme_Multi-Core%20Debug%20Solution%20IP.pdf>> on Nov. 28, 2012; 23 pages.

* cited by examiner

PROGRAM CORRELATION TRACE MESSAGE

FIG. 5

DIRECT BRANCH TRACE MESSAGE

FIG. 6

DIRECT BRANCH TRACE WITH ADDRESS MESSAGE

INDIRECT BRANCH TRACE MESSAGE WITH VIRTUAL ADDRESS

FIG. 9

INDIRECT BRANCH TRACE MESSAGE WITH PHYSICAL ADDRESS

FIG. 10

DIRECT BRANCH TRACE MESSAGE WITH HISTORY

FIG. 11

ADDRESS TRANSLATION TRACE MESSAGE
GENERATION FOR DEBUG

BACKGROUND

1. Field of the Disclosure

This disclosure relates generally to semiconductors, and more specifically, to data processors that implement a debug mode of operation.

2. Description of the Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system, is highly desirable to remain transparent to operation of the system.

Debug messages include trace messages that are generated by the data processing system. Trace messages can contain address and data information for either program events (program trace messaging) that relates to the execution sequence of instructions, or to data events (data read messaging, data write messaging). The address information is typically virtual address information that must be translated to identify a physical memory location known as a physical address. Correlation of virtual address information associated with debug messages to physical address information allows a debug tool a straight forward mechanism to trace programs via a listing of instructions obtained at static compile and link time that uses virtual address. However, an issue arises when such a listing is unavailable for pre-compiled software modules that are executed at runtime, such as OS cells, library functions, etc. In this case, no program listing is available making it difficult to properly trace and interpret these sections of code when executed. In such situations, the inability to deterministically translate virtual addresses to physical addresses can preclude debug message generation from being performed real-time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

During a debug mode of operation it is determined at a data processor that an instruction stream has caused a page crossing at physical memory. In response, a synchronization event is performed to provide physical address information related to the page crossing in order to facilitate instruction tracing at an external trace reconstruction tool. For example, a trace message that includes the physical address of the instruction to be executed following the physical page crossing occurrence can be provided to external terminals of the data processor for use by an external debug tool. Various aspects of the present disclosure will be better understood with reference to FIGS. 1-8 discussed below.

Figure 1:
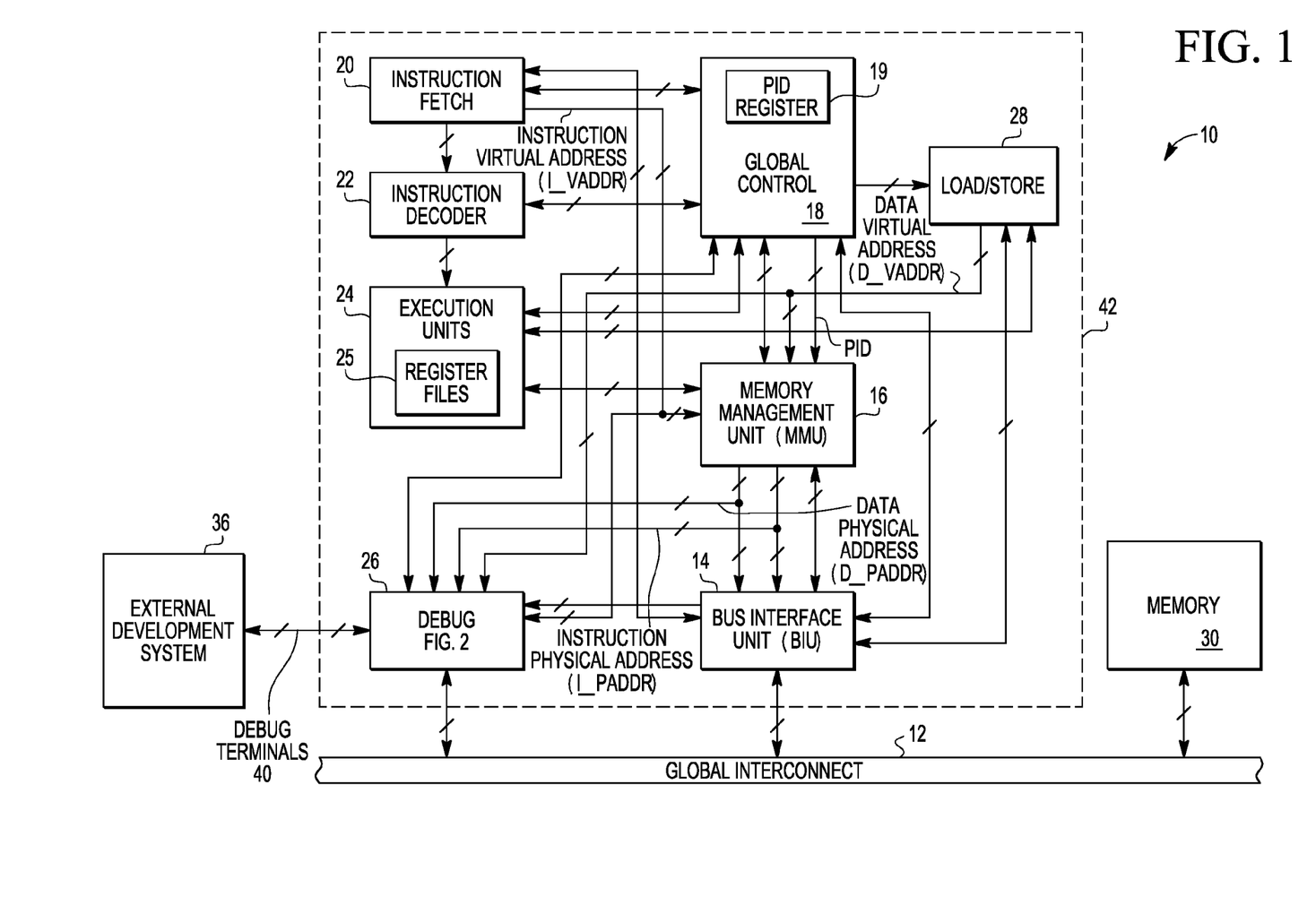
FIG. 1 illustrates in block diagram form a data processing system having debug message generation in accordance with one form of the present disclosure.
Figure 3:
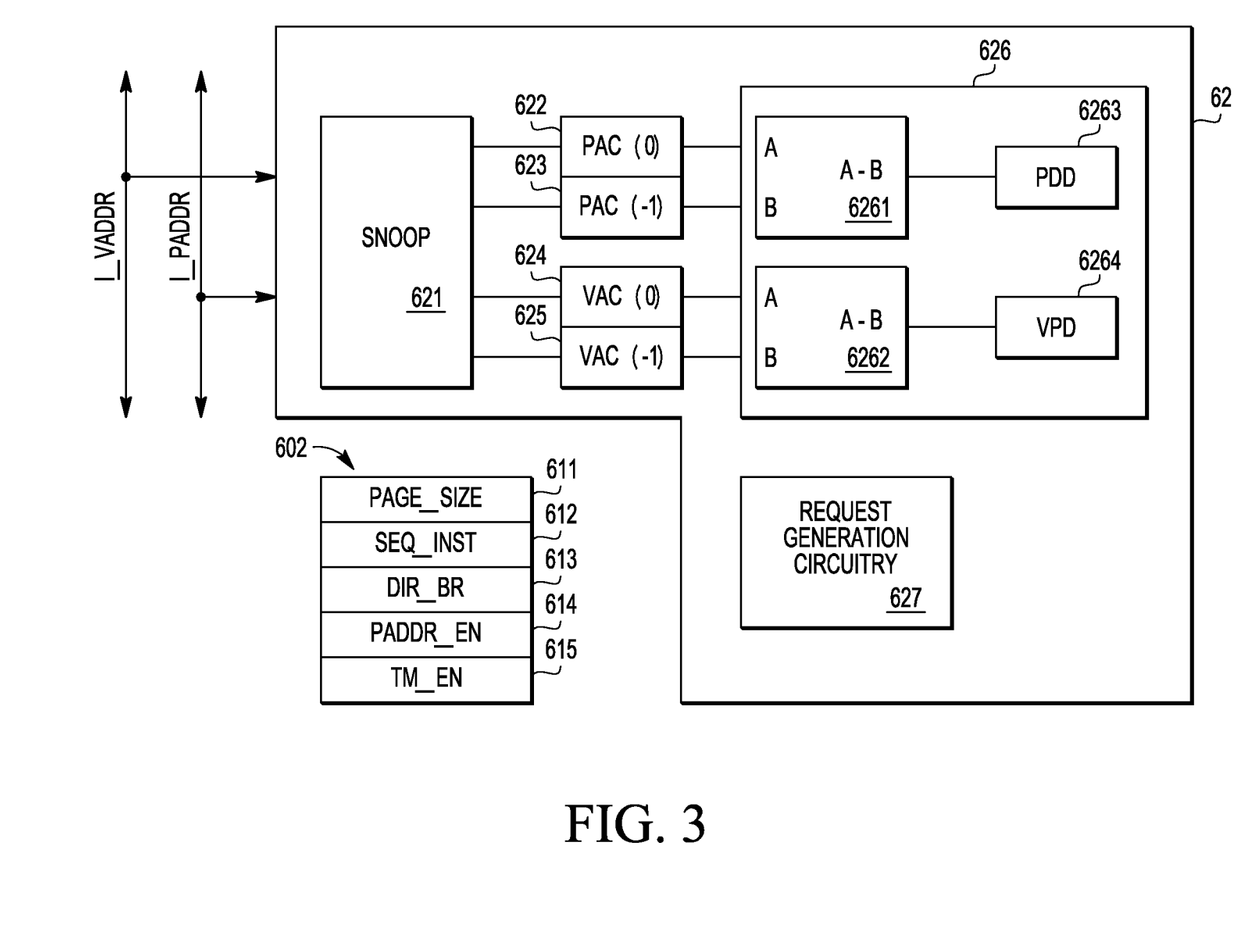
FIG. 3 illustrates in block diagram form a trace message request module of FIG. 2 in accordance with one form of the present disclosure.

Illustrated in FIG. 1 is a data processing system 10 that supports trace messaging during a debug mode of operation. Within data processing system 10 is a global interconnect 12. In one form global interconnect 12 is a system bus. Other forms of interconnect may be used including, for example, crossbars, point-to-point connections, and optical and wireless transmission techniques. A bus interface unit (BIU) 14 is coupled to global interconnect 12 via a bidirectional coupling. In one form the bidirectional coupling is a bidirectional multiple conductor bus wherein multiple conductor buses herein are represented with a slash across the conductor. BIU 14 is bidirectionally coupled to memory management unit (MMU) 16. MMU 16 is coupled to a first input/output terminal of a global control circuit 18 via a bidirectional multiple conductor bus. A second input/output terminal of global control circuit 18 is coupled to a first input/output terminal of an instruction fetch unit 20 via a bidirectional multiple conductor bus. Instruction fetch unit 20 has an output coupled to an input of an instruction decoder 22 via a multiple conductor bus. An output of instruction decoder 22 is coupled to an input of execution units 24. In one form execution units 24 include at least one arithmetic logic unit, at least one floating point unit and at least one multiplier circuit. Within the execution units 24 are register files 25. An input/output terminal of instruction decoder 22 is coupled to a third input/output terminal of the global control circuit 18. A first input/output terminal of execution units 24 is coupled to a fourth input/output terminal of global control circuit 18. Execution units 24 and instruction fetch unit 20 are also bidirectionally coupled to MMU 16. Debug module 26 includes trace message request logic 62 and has an input/output terminal coupled to a fifth input/output terminal of global control circuit 18. A load/store unit 28 has a first input/output terminal bidirectionally coupled to a sixth input/output terminal of global control circuit 18. Load/store unit 28 has a second input/output terminal coupled to a first input/output terminal of BIU 14. Load/store unit 28 has a third input/output terminal coupled to a second input/output terminal of execution units 24. A second input/output terminal of BIU 14 is coupled to a seventh input/output terminal of global control circuit 18. An output of load/store unit 28 provides a data virtual address (D_VADDR) and is coupled to a first input of MMU 16 and a first input of debug module 26. An output of instruction fetch unit 20 provides an instruction virtual address (I_VADDR)

and is coupled to a second input of MMU 16 and a second input of debug module 26. A first output of MMU 16 provides a data physical address (D_PADDR) and is coupled to a first input of BIU 14 and to a third input of debug module 26. A second output of MMU 16 provides an instruction physical address (I_PADDR) and is coupled to a second input of BIU 14 and to a fourth input of debug module 26.

A memory 30 is coupled to global interconnect 12 via a bidirectional coupling. Debug module 26 has a second input/output terminal coupled to a plurality of debug terminals 40 via bidirectional multiple conductors. The plurality of debug terminals 40 are coupled to an external development system 36 that is an external debug tool commonly referred to as a debugger or external debugger. In the illustrated form BIU 14, MMU 16, global control circuit 18, instruction fetch unit 20, instruction decoder 22, execution units 24 with register files 25, debug module 26 and load/store unit 28 collectively form a data processor 42 as indicated by the dashed line grouping in FIG. 1. While global control circuit 18 is illustrated in FIG. 1 in a segregated location, it should be well understood that the module and functional control of global control circuit 18, as well as that of other modules, may also be implemented in a distributed manner and be included within any of the various other system blocks of data processing system 10. For example, the storage locations 602 illustrated at the debug control module 60 of FIG. 3 can include register fields that are part of control circuit 18 and register files 25. Also, in the illustrated embodiment, global control 18 includes a process identifier (PID) register 19 that stores a process identifier (PID) for the currently executing process. Global control 18 also provides the PID to MMU 16.

In operation, data processing system 10 communicates with devices (not shown) via global interconnect 12. Information communicated with data processor 42 transfers through BIU 14. Instruction fetch unit 20 retrieves data processor instructions (i.e. processor instructions) from BIU 14 under control of global control circuit 18. The retrieved instructions are sequentially communicated to instruction decoder 22 for decoding under control of global control circuit 18. Execution units 24 execute instructions and generate data that is either stored in a cache (not shown) or placed in the memory 30 via coupling through global control circuit 18, BIU 14 and global interconnect 12. Debugging of the operation of data processor 42 and data processing system 10 is performed by the use of debug module 26 that generates debug messages for analysis by external development system 36. A test or debug mode of operation is entered in response to activation of such from external development system 36. In the illustrated form, debug module 26 is configured to receive data virtual addresses, data physical addresses, instruction virtual addresses, instruction physical addresses, data information from BIU 14 and load/store unit 28, and information from global control 18. A data address is an address where data resides whereas an instruction address is an address where an instruction resides. Instruction virtual addresses are provided from instruction fetch unit 20 to the debug module 26 and MMU 16. A virtual address is an un-translated address which requires some further processing or translating to obtain a translated address of the physical storage location where the information is residing. This translated address is referred to as the physical address. MMU 16 provides instruction physical addresses to BIU 14 and debug module 26 by translating addresses of virtual pages of memory to corresponding physical page addresses. Pages of memory are contiguous locations which are grouped, and typically have a size that is a power of 2, such as for example a 4 Kbyte page, a 16 Kbyte page, a 64 Kbyte page, etc. Load/store unit 28 provides data virtual addresses to debug module 26 and to MMU 16. MMU 16 provides data physical addresses to BIU 14 and debug module 26. Debug module 26 forms a debug message for external development system 36 based upon information at one or more of the received addresses, as will be discussed in more detail below. The format of debug messages may vary and examples will be discussed below in connection with FIGS. 2-8.

Figure 2:
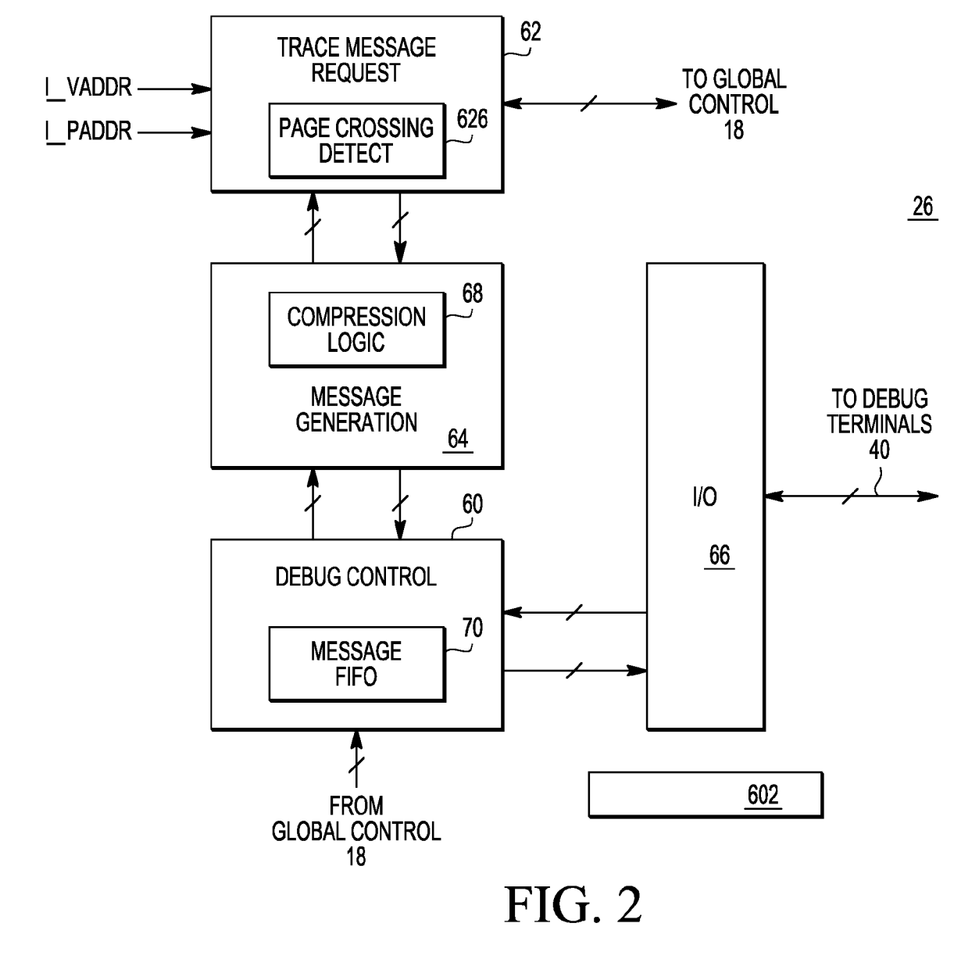
FIG. 2 illustrates in block diagram form a debug module of FIG. 1 in accordance with one form of the present disclosure.

Illustrated in FIG. 2 is an exemplary embodiment of a portion of the debug module 26 of FIG. 1 that includes debug control module 60, trace message request module 62, message generation module 64, storage locations 602 and input/output (I/O) module 66. Debug control module 60 includes a first-in first-out storage circuit (FIFO) 70 and is bidirectionally coupled to message generation module 64 and I/O module 66. Debug control module 60 also receives information from global control circuit 18, register files 25, and the like, which can include register information represented by storage location 602. I/O module 66 is bidirectionally coupled to debug terminals 40. Trace message request module 62 is bidirectionally coupled to message generation module 64, and includes page crossing detect module 626. Trace message request module 62 is coupled to instruction physical address (I_PADDR), to instruction virtual address (I_VADDR), and to global control 18.

During debug operation, trace message request module 62 is the logic module that determines when a synchronization event, such as a trace message of a predetermined format, is to be generated by message generation module 64. Message generation module 64 generates certain debug messages based on a message generation request from trace message request module 62. Compression module 68 may perform message compression on parts or all of the messages generated by message generation module 64. Generated messages are provided to debug control module 60 where they are stored in message FIFO 70 before being transmitted. From message FIFO 70, the debug messages are routed to debug terminals 40 via I/O module 66.

In one embodiment, trace message request module 62 includes page crossing detect module 626 that monitors the instruction stream at the physical and virtual buses to determine when a page crossing occurs from one page of memory to another, thereby allowing the trace message request module 62 to determine whether to request a debug message be generated that includes physical address information for the instruction of the instruction stream in the new physical page for the physical page crossing. Trace message request module 62 and page crossing detect module 626 will be described further understood with reference to FIGS. 3-8.

Illustrated in FIG. 3 is one embodiment of portions of trace message request module 62 and storage location 602. The portions of trace message request module 62 includes snoop module 621, storage location 622, storage location 623, storage location 624, storage location 625, page crossing detect module 626, and request generation module 627. Page crossing detect module 626 includes compare module 6261, compare module 6262, storage location 6263, and storage location 6264. Storage location 602 is illustrated to include storage locations 611-615, which can represent register fields. Storage location 611 stores information labeled as PAGE_SIZE that indicates the memory page size. Storage location 612 stores information labeled SEQ_INST that when asserted indicates that the currently executed instruction is consecutive in virtual address space to the previously executed instruction, thereby indicating that the current instruction was not executed as the result of a branch being taken or an exception being encountered. Storage location

613 stores information labeled DIR_BR that when asserted indicates that the current instruction was executed as the result of a direct branch being taken. Storage location 614 stores information labeled PADDR_EN that when asserted indicates that physical address reporting is enabled. Storage location 615 stores information labeled TM_EN that when asserted indicates debug module 26 is to generate trace messages.

Snoop module 621 is connected to bus I_VADDR, bus I_PADDR, and storage locations 622-625. Storage locations 622 and 623 are connected to compare module 6261. Storage locations 624 and 625 are connected to compare module 6262. Page crossing detect module 626 is connected to request generation module 627 (not shown). Storage locations 611-615, are connected to trace message request module 62 (not shown).

During operation, snoop module 621 monitors the information on bus I_VADDR and on bus I_PADDR, e.g., snoops buses I_VADDR and I_PADDR, to determine the physical and virtual address of each requested instruction. The physical address associated with a current instruction at bus I_PADDR is labeled "PAC[0]" and is stored at storage location 622. The physical address associated with the previous instruction accessed at bus I_PADDR is labeled "PAC[−1]" and is stored storage location 623. The virtual address associated with the current instruction that translates to PAC[0] is retrieved from bus I_VADDR, is labeled "VAC[0]", and stored at storage location 624. The virtual address associated with the current instruction that translates to PAC [−1] is retrieved from bus I_VADDR, is labeled "VAC[−1]," and is stored at storage location 625 It will be appreciated that due to prefetching that instructions may be accessed that are not executed. However, for purposes of description herein, prefetching is ignored and it is assumed that instructions are executed in the order accessed.

Compare module 6261 of page crossing detect module 626 compares the physical addresses of the current instruction to that of the sequentially executed previous instruction to determine if the current instruction of the instruction execution stream caused a physical page of memory to be crossed. An offset between accessed physical pages can be determined at compare module 6261 by the equation:

Physical Page Offset=(PAC[0]/PAGE_SIZE)−(PAC[−1]/PAGE_SIZE), where PAGE_SIZE is the page size of each page of memory stored at storage location 611, and based on PAGE_SIZE, the low order page index bits of PAC[0] and PAC[1] are discarded, and a comparison made of the remaining high-order page frame address bits to determine if a physical page crossing has occurred. PAGE_SIZE can be programmable, and in one embodiment, can change dynamically based on each address translation performed by MMU 16. A non-zero page offset indicates a page crossing has occurred at physical memory. The physical page offset calculated at compare module 6261 is stored at storage location 6263 and indicates the number of physical pages crossed, where a value of zero [0] indicates no physical page was crossed.

Compare module 6262 of page crossing detect module 626 compares the virtual addresses of sequentially executed instructions to determine if a virtual page of memory has been crossed. This can be determined by implementing the equation:

Virtual Page Offset=(VAC[0]/PAGE_SIZE)−(VAC[−1]/PAGE_SIZE).

where based on PAGE_SIZE, the low order page index bits of VAC[0] and VAC[1] are discarded, and a comparison made of the remaining high-order virtual page frame address bits to determine if a virtual page crossing has occurred. PAGE_SIZE can be programmable, and in one embodiment, can change dynamically based on each address translation performed by MMU 16. A non-zero page offset indicates a page boundary crossing has occurred at virtual memory. The virtual page offset calculated at compare module 6262 is stored at storage location 6264 and indicates the number of virtual pages crossed, where a value of zero [0] indicates no virtual page boundary was crossed. The offset information can be used by message request module 627 to determine whether a message request is to be sent to message generation module 64 as will be better understood with reference to FIGS. 4-8.

Figure 4:
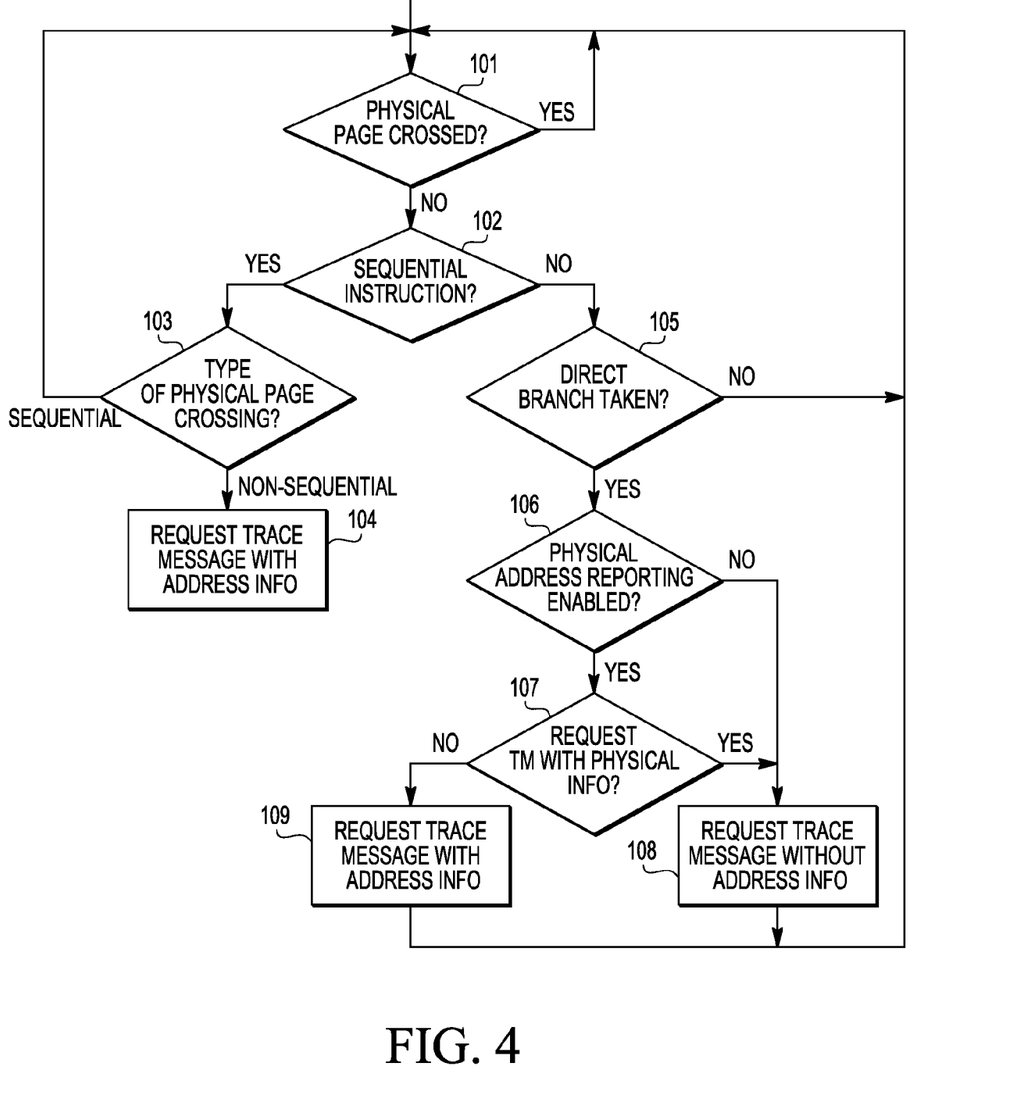
FIG. 4 illustrates in flow diagram form a method in accordance with one form of the present disclosure.

Illustrated at FIG. 4 is one example of a method implemented by message request module 626 that is used when trace messaging is enabled, e.g., when TM_EN at storage location 615 is asserted, to determine when to send a request to message generation logic 64 to generate a trace message. At block 101 it is determined whether a physical page boundary has been crossed. As previously described, a non-zero value of PPD at storage location 6263 is indicative of a physical page boundary having been crossed. For example, PPD will have a non-zero value when a current access is to a first physical address of the physical memory and a previous access is to a second physical address of physical memory that is at a different page. When a physical page is crossed flow proceeds to block 102, otherwise, flow returns to block 101.

At block 102 it is determined whether the current instruction that caused the physical page crossing is sequential in virtual memory with the previous instruction. It will be appreciated that instructions that are sequential in virtual memory are stored at consecutive virtual memory locations, and, therefore, executed back-to-back unless a branch is taken or exception occurs. At trace message request module 62, SEQ_INST at storage location 612 is asserted to indicate that the current instruction is sequential in virtual memory with the previous instruction when asserted. When the current instruction is sequential in virtual memory to the previous instruction, flow proceeds to block 103 from block 102, otherwise flow proceeds to block 105.

At block 103 the type of page crossing is determined. For example, in response to the type of page crossing being a sequential page crossing, flow returns to block 101, and in response to the type of page crossing being a non-sequential page crossing flow proceeds to block 104. As used herein, a sequential page crossing occurs when the smallest address of a current page being accessed is consecutive with the largest address of the previously accessed page. As used herein, a non-sequential page crossing occurs when the smallest address of a current page being accessed is not consecutive with the largest address of the previously accessed page. For example, in the embodiment described at FIG. 3, a PPD value of one (1) indicates that the physical page crossing that occurred was a sequential page crossing. Flow proceeds to block 101 when the detected physical page crossing was a sequential page crossing. Flow proceeds to block 104 when the detected physical page crossing was a non-sequential page crossing, such as when a previous page is accessed, e.g., indicated by a negative PPD value, or when the sequential page in physical memory is skipped, e.g., indicated by a value of PDD greater than one (1).

At block 104, a request to generate a trace message with an address indicator is generated as will be discussed in greater detail below. Referring back to block 102, flow proceeds to block 105 when the current instruction is not sequential in virtual memory with the previous instruction. For example, flow will proceed to block 105 in response to the current instruction being executed as the result of a branch being taken or an exception occurring. At block 105, it is determined whether the current instruction is executed as a result of a direct branch being taken. A direct branch is a branch whose target is directly provided with the instruction, such as by an offset value, and thus is typically a static value that can be determined by the debugger based on knowledge of the program instruction values. In the embodiment described at FIG. 3, DIR_BR is asserted at storage location 613 in response to the previous instruction being a direct branch that was taken, thereby causing the current instruction to be executed, e.g., the current instruction is not sequential in virtual memory with the previous instruction. If the non-sequential instruction flow was the result of a direct branch instruction, flow proceeds to block 106, otherwise flow returns to block 101.

At block 106 a determination is made whether physical address reporting is enabled. For example, PADDR_EN at storage location 614 can indicate whether physical addressing is enabled. When enabled, flow proceeds to block 107, otherwise flow proceeds to block 108 where a trace message, such as a direct branch trace message, is generated without physical address information as described in greater detail below.

At block 107, a determination is made whether a criteria is met indicating a trace message with physical address information should be requested. If so, flow proceeds to block 109, otherwise flow proceeds to block 108. In one embodiment, the criteria is met when the physical and virtual pages have been incremented by different amounts, i.e., when PPD≠VPD, as a result of the current instruction being executed, which is indicative of the current physical page having a different offset from the previous physical page than the current virtual page's offset from the previous virtual page. In another embodiment, the criteria at block 107 is met when the physical and virtual pages are incremented by different amounts or when the physical and virtual pages are incremented by the same amount that is outside of a desired range. For example, flow can proceed to block 109 when ((PPD≠VPD) or when (|PPD|>N)), where N is a positive integer. For example, in one embodiment, N=1, whereby any direct branch causing a new physical page to be accessed other than a next page in sequence, e.g., PPD=1, or a previous page in sequence, e.g., PPD=−1, will cause flow to proceed from block 107 to block 109. In another embodiment, the criteria is met any time a physical page boundary is crossed.

Figure 5:
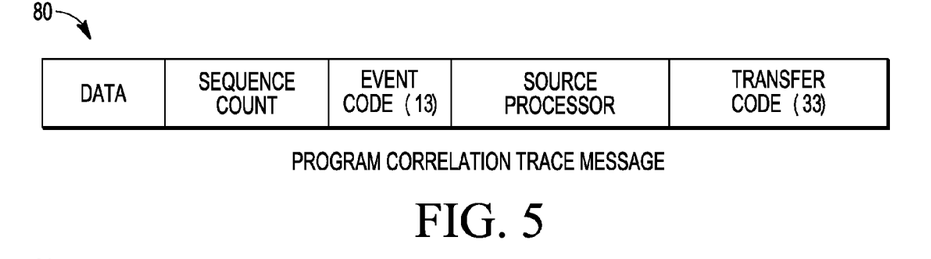
FIG. 5 illustrates in diagram form an exemplary trace message in accordance with one form of the present disclosure.
Figure 6:
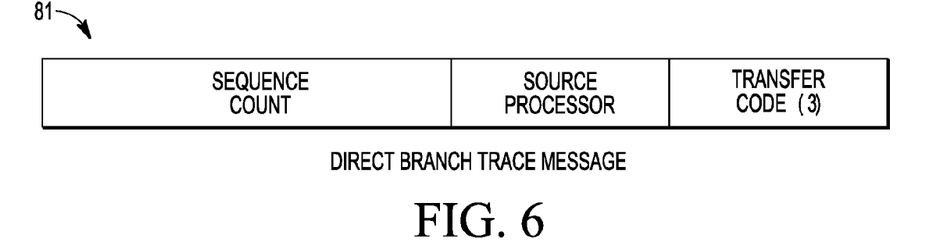
FIG. 6 illustrates in diagram form an exemplary trace message in accordance with the prior art.
Figure 7:
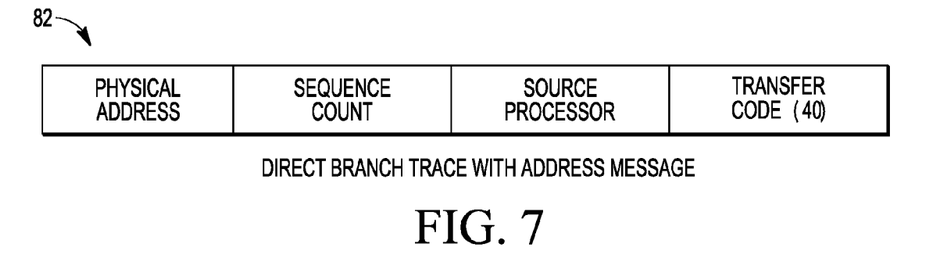
FIG. 7 illustrates in diagram form an exemplary trace message in accordance with the prior art.

When the flow of the method illustrated at FIG. 4 is to block 104, block 108, or block 109, a request to generate a trace message is generated. For example, a trace message that includes physical address information will be requested at block 104 in response to instructions that are sequential in virtual memory causing a non-sequential page crossing. FIGS. 5-7 illustrate various TRACE MESSAGES that can be generated.

FIG. 5 illustrates an example of a trace message 80 referred to as a Program Trace Correlation message, that can be requested at block 104 to facilitate synchronization during program trace. The trace message 80 contains a field labeled TRANSFER CODE (TCODE), a field labeled "SOURCE PROCESSOR", a field labeled "EVENT CODE", a field labeled "SEQUENCE COUNT", and a field labeled "DATA". The field TRANSFER CODE includes a value associated with the message to identify the trace message 80 as a specific type of debug message, e.g., as a PROGRAM TRACE CORRELATION MESSAGE, that is understood to have a particular predetermined field format. The TRANSFER CODE field is useful when trace messages with different field formats can be sent. The trace message 80 has a TRANSFER CODE value of 33 to indicate that the message is a Program Trace Correlation Message, which is a known type of trace message. The field SOURCE PROCESSOR identifies the processor in a multi-processor system to which the trace message 80 is associated. The field EVENT CODE identifies an event that caused the trace message 80 to be generated. In accordance with the present embodiment, the current EVENT CODE has a value of 13 to indicate the message is being generated due to non-sequential physical pages being crossed, e.g., PPD≠1, in response to an instruction that is sequential in virtual memory space to the previous instruction being executed. The table below indicates other events that can result in trace message 80 being generated.

TABLE 13-6

| Event Code Encoding (TCODE = 33) | |
|---|---|
| Event Code | Description |
| 0000 | Entry into Debug Mode |
| 0001 | Entry into Low Power Mode (CPU only) |
| 0010-0011 | Reserved |
| 0100 | Disabling Program Trace |
| 0101-1000 | Reserved |
| 1001 | Begin masking of program trace messages based on register setting |
| 1010 | Branch and link occurrence (direct branch function call) |
| 1011-1100 | Reserved |
| 1101 | Non-Sequential physical page address change of flow due to sequential instruction flow |
| 1110 | Trace disable or entry into a VLE page from a non-VLE page |
| 1111 | End of VLE tracing (trace disabled or entry into a non-VLE page from a VLE page) |

The field SEQUENCE COUNT contains a value that represents a number of instructions that have been executed since the last trace message was generated. In response to the trace message 80 having an EVENT CODE of 13, which indicates the message is being non-sequential physical pages being crossed, the field DATA will be treated the same as the field PHYSICAL DATA as described below, whereby the message generation module will include the physical address information at field DATA that identifies the location in physical memory of the current instruction.

FIG. 6 illustrates an example of a currently existing trace message 81, referred to as a Direct Branch Message that can be requested at block 108 to maintain synchronization of during program trace. Flow transitioned to block 108 in response to physical address reporting being disabled, or in response to a direct branch being taken that did not meet the criteria of block 107 as needed to flow to block 109 where a trace message with address information is requested. The trace message 81 contains the fields TRANSFER CODE, SOURCE PROCESSOR, and SEQUENCE COUNT as previously described. The TRANSFER CODE value for trace message 81 is three (3). Note that the trace message 81 is also requested by the debug module 26 in response to a direct branch being taken that does not cross a physical page boundary. Note that no DATA field is included, since the debugger can determine the destination of the branch based solely on the content of the instruction encoding itself and knowledge of the location in memory of the direct branch instruction. For these cases, trace bandwidth can be conserved, since no additional address location information needs to be transmitted.

At block 109 the criteria at block 107 was not met and therefore, a trace message with address information is requested. FIG. 7 illustrates an example of a message 82, referred to as a Direct Branch Message with Address that can be requested at block 109 to keep synchronization during program trace. The trace message 82 contains the fields TRANSFER CODE, SOURCE PROCESSOR, SEQUENCE COUNT, as previously described, and an additional field labeled "PHYSICAL ADDRESS". The field PHYSICAL ADDRESS can include, a representation, in compressed or uncompressed form, of: the entire physical address, e.g., the full target address; an offset, e.g., a relative address, that when added to the physical address of the previously reported physical address equals the current physical address; or a portion of the current physical address, e.g., some portion of the least or most significant bits.

Figure 8:
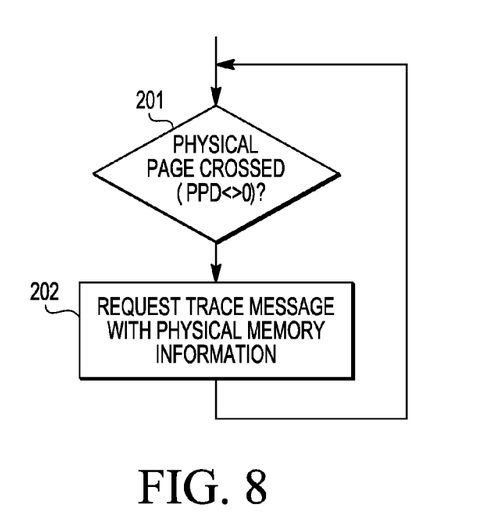
FIG. 8 illustrates in flow diagram form a method in accordance with one form of the present disclosure.

By now it should be appreciated that there has been provided a data processing system having efficient real-time debug addressing by generating trace messages that selectively include physical address information in response to a physical page crossing determination. It will be appreciated that many variations of generating trace messages that include physical address information can be envisioned. For example, FIG. 8 illustrates a flow diagram of an embodiment, whereby a trace message with address information is generated anytime that a physical address page is crossed. For example, a trace message 80 as described at FIG. 5 can be generated.

Figure 9:
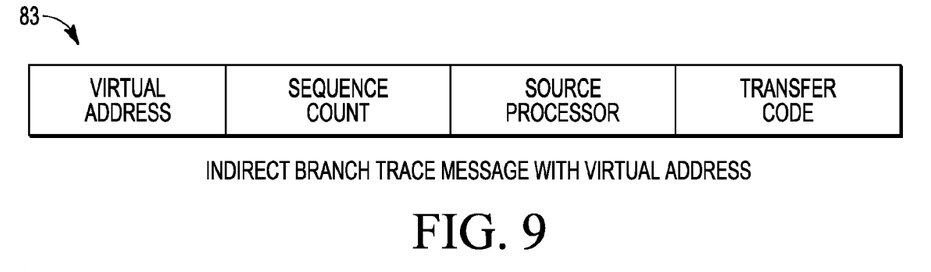
FIG. 9 illustrates in diagram form an exemplary trace message in accordance with the prior art.
Figure 10:
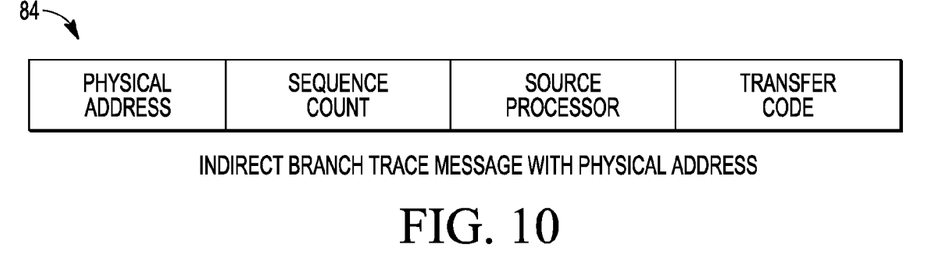
FIG. 10 illustrates in diagram form an exemplary trace message in accordance with the prior art.

In another embodiment, while the specific embodiment described above has been in reference to a direct branch, it will be appreciated that the described techniques can include other types of branches as well. For example, when the branch is an indirect branch, an indirect branch trace message with a physical address information, such as the branch message 83 that illustrated at FIG. 9, can be requested in response to PADDR_EN being set, and the indirect branch trace message can be requested with virtual address information, such as the branch message 84 that illustrated at FIG. 10, in response to PADDR_EN being cleared.

Figure 11:
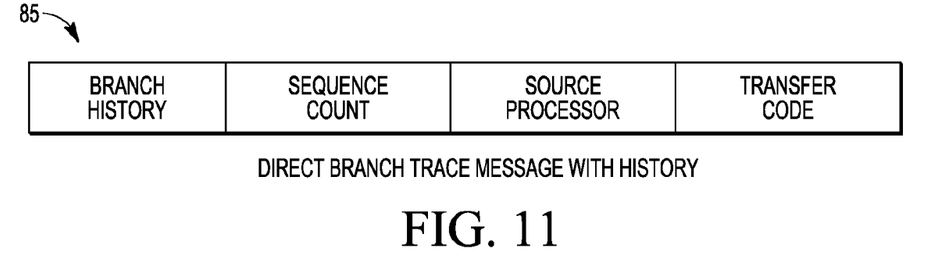
FIG. 11 illustrates in diagram form an exemplary trace message in accordance with the prior art.

In yet another embodiment, the requested trace message that includes the physical address information can also include trace history information, for example, in response a trace history indicator being enabled. FIG. 11 illustrates an example of a direct branch trace message 85 with history that includes a branch history field. The branch history field contains a plurality of 1-bit values, where, for each direct branch taken since the last program trace message, a corresponding 1-bit value is set or cleared to indicate whether the direct branch was taken or not taken. It will be appreciated that other types of trace messages, such as indirect trace messages, can also include the branch history field as described.

In addition, that the methods described herein are independent of the attributes of a specific instruction set residing at the new page, and therefore is different than the previously known technique that generated a trace message to indicate when a newly encountered page stores instructions having a different instruction set attribute, such as an instruction length attribute, than the previous page. For example, the prior art discloses that a physical page of memory can store instructions from variable length instruction set, or from an instruction set having fixed length instructions.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In addition, many different aspects are supported by the disclosure herein. In accordance with one aspect of the present disclosure, it is determined at a data processor during a debug mode of operation that an instruction stream has caused a physical page crossing to occur at a physical memory; and, in response to the determining, a synchronization event is performed that provides physical address information of the instruction stream for an external trace reconstruction tool. In an embodiment, determining can include determining a current access to a first physical address of the physical memory is to a different page of physical memory than a previous access to a second physical address of the physical memory, and the physical address information includes a representation of at least a portion of the first physical address. In addition, performing the synchronization event can comprise providing a trace message comprising the provided physical address information to external terminals of the data processor. 4. In an alternate embodiment, performing the synchronization event can include generating a trace message indicative of the occurrence of physical page crossing event. In addition, the trace synchronization message can be indicative of the occurrence of physical page crossing event comprises a representation of the physical address causing the page crossing event to occur. In an alternate embodiment, performing the synchronization event can include generating a trace message that provides the physical address information. In addition, the representation of the physical address can include a compressed value generated based on at least a portion of the physical address causing the physical page crossing. In an alternate embodiment, determining can further comprise determining that a virtual page crossing has occurred at virtual memory for the instruction stream. In an alternate embodiment, determining at the data processor can further comprise determining that the physical page crossing is one of a first type of physical page crossing or a second type of physical page crossing. In addition, the first type of physical page crossing can comprise a non-sequential physical page crossing. In addition, the alternate embodiment can include not performing any synchronization event in response to determining at the data processor that the occurrence of the physical page crossing comprises a sequential page crossing. In addition, the alternate embodiment can comprise, in response to the occurrence of the physical page crossing being of the second type, performing a synchronization event for use by instruction trace logic that does not provide physical address information. In an alternate embodiment, in response to determining, the synchronization event can be performed that provides physical address information if physical address reporting is enabled and performing a debug mode synchronization event for use by instruction trace logic that does not provide physical address information if physical address reporting is disabled.

In accordance with another aspect of the disclosure, a first offset is determined between a first page of virtual memory for an instruction stream and a prior page of virtual memory for the instruction stream, wherein the first offset is indicative of the number of pages from the current page of virtual memory and the prior page of virtual memory; a second offset is determined between a current page of physical memory, corresponding to the current page of virtual memory, and a prior page of physical memory, corresponding to the prior page of virtual memory, wherein the second offset is indicative of the number of pages from the current page of physical memory and the prior page of physical memory; a debug mode synchronization event is generated during a debug mode of operation in response to the first offset being different than the second offset. In an alternate embodiment, generating the synchronization event is further in response to determining a branch instruction has been taken. In addition, generating the synchronization event can be further in response to determining a direct branch instruction has been taken. Alternatively, generating the synchronization event can be further in response to determining that sequential instructions in virtual memory caused the first offset to be one.

In accordance with another aspect of the disclosure, a device includes an instruction fetch module to request instructions from virtual memory; a memory management unit to request the instructions from physical memory; and a trace message request module to determine that an instruction requested from physical memory resulted in a physical page crossing and, in response, the trace message request module to request a trace message be generated that provides physical address information of the instruction causing the physical page crossing. In an alternate embodiment, a trace message requested by the trace message request module is to further request the trace message in response to an indication that the instructions causing the page crossing were sequentially stored in virtual memory. Alternatively, the trace message request module is further to request that the trace message be of a first type in response to determining that the physical page crossing was the result of instructions sequentially stored in virtual memory being executed, and the trace message request module is further to request that the trace message be of a second type in response to determining the physical page crossing was the result of instructions non-sequentially stored in virtual memory being executed.

Thus, it is to be understood that the implementations depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any number of integrated circuit chips may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   determining at a hardware data processor during a debug mode of operation that an instruction stream has caused a physical page crossing to occur at a physical memory, the physical page crossing comprising a current access to a first physical address of the physical memory being to a different page of physical memory than a previous access to a second physical address of the physical memory; and
   in response to determining that an instruction stream has caused a physical page crossing to occur,
   performing a synchronization event that provides physical address information of the instruction stream during the debug mode that includes a representation of at least a portion of the first physical address.

2. The method of claim 1, wherein performing the synchronization event comprises a trace message comprising the provided physical address information to external terminals of the data processor.

3. The method of claim 1, wherein performing the synchronization event includes generating a trace message indicative of the occurrence of the physical page crossing.

4. The method of claim 3, wherein the trace message indicative of the occurrence of the physical page crossing comprises a representation of the first physical address.

5. The method of claim 1, wherein performing the synchronization event includes generating a trace message that provides the physical address information.

6. The method of claim 5, wherein the representation of the physical address information includes a compressed value generated based on at least a portion of the first physical address.

7. The method of claim 1 wherein determining further comprises determining that a virtual page crossing has occurred at virtual memory for the instruction stream.

8. The method of claim 1, wherein determining at the data processor further comprises determining that the physical page crossing is one of a first type of physical page crossing or a second type of physical page crossing.

9. The method of claim 8, wherein the first type of physical page crossing comprises a non-sequential physical page crossing.

10. The method of claim 9 further comprising:
not performing any synchronization event in response to determining at the data processor that the occurrence of the physical page crossing comprises a sequential page crossing.

11. The method of claim 9 further comprising:
in response to the occurrence of the physical page crossing being of the second type, performing a synchronization event for use by instruction trace logic that does not provide physical address information.

12. The method of claim 1 further comprising:
in response to the determining, performing the synchronization event that provides physical address information if physical address reporting is enabled, and performing a debug mode synchronization event for use by instruction trace logic that does not provide physical address information if physical address reporting is disabled.

13. A method comprising:
determining a first offset between a first page of virtual memory for an instruction stream and a prior page of virtual memory for the instruction stream, wherein the first offset is indicative of the number of pages from the current page of virtual memory and the prior page of virtual memory;
determining a second offset between a current page of physical memory, corresponding to the current page of virtual memory, and a prior page of physical memory, corresponding to the prior page of virtual memory, wherein the second offset is indicative of the number of pages from the current page of physical memory and the prior page of physical memory;
generating a debug mode synchronization event during a debug mode of operation in response to the first offset being different than the second offset.

14. The method of claim 13 wherein generating the synchronization event is further in response to determining a branch instruction has been taken.

15. The method of claim 13, wherein generating the synchronization event is further in response to determining a direct branch instruction has been taken.

16. The method of claim 13, wherein generating the synchronization event is further in response to determining that sequential instructions in virtual memory caused the first offset to be one.

17. A device comprising:
a hardware instruction fetch module to request instructions from virtual memory;
a hardware memory management unit to request the instructions from physical memory; and
a hardware trace message request module to determine that an instruction requested from physical memory resulted in a physical page crossing,
the physical page crossing comprises a current access to a first physical address of the physical memory that is to a different page of physical memory than a previous access to a second physical address of the physical memory, and,
in response to an instruction requested from physical memory that resulted in a physical page crossing, the trace message request module to request a trace message be generated that provides physical address information of the instruction causing the physical page crossing, the physical address information includes a representation of at least a portion of the first physical address.

18. The device of claim 17, wherein the trace message requested by the trace message request module is to further request the trace message in response to an indication that the instructions causing the page crossing were sequentially stored in virtual memory.

19. The device of claim 17, wherein the trace message request module is further to request that the trace message be of a first type in response to determining that the physical page crossing was the result of instructions sequentially stored in virtual memory being executed, and the trace message request module is further to request that the trace message be of a second type in response to determining the physical page crossing was the result of instructions non-sequentially stored in virtual memory being executed.

* * * * *